Sept. 10, 1935.  O. HUKARI  2,013,959
SPRAY NOZZLE
Filed Sept. 24, 1934
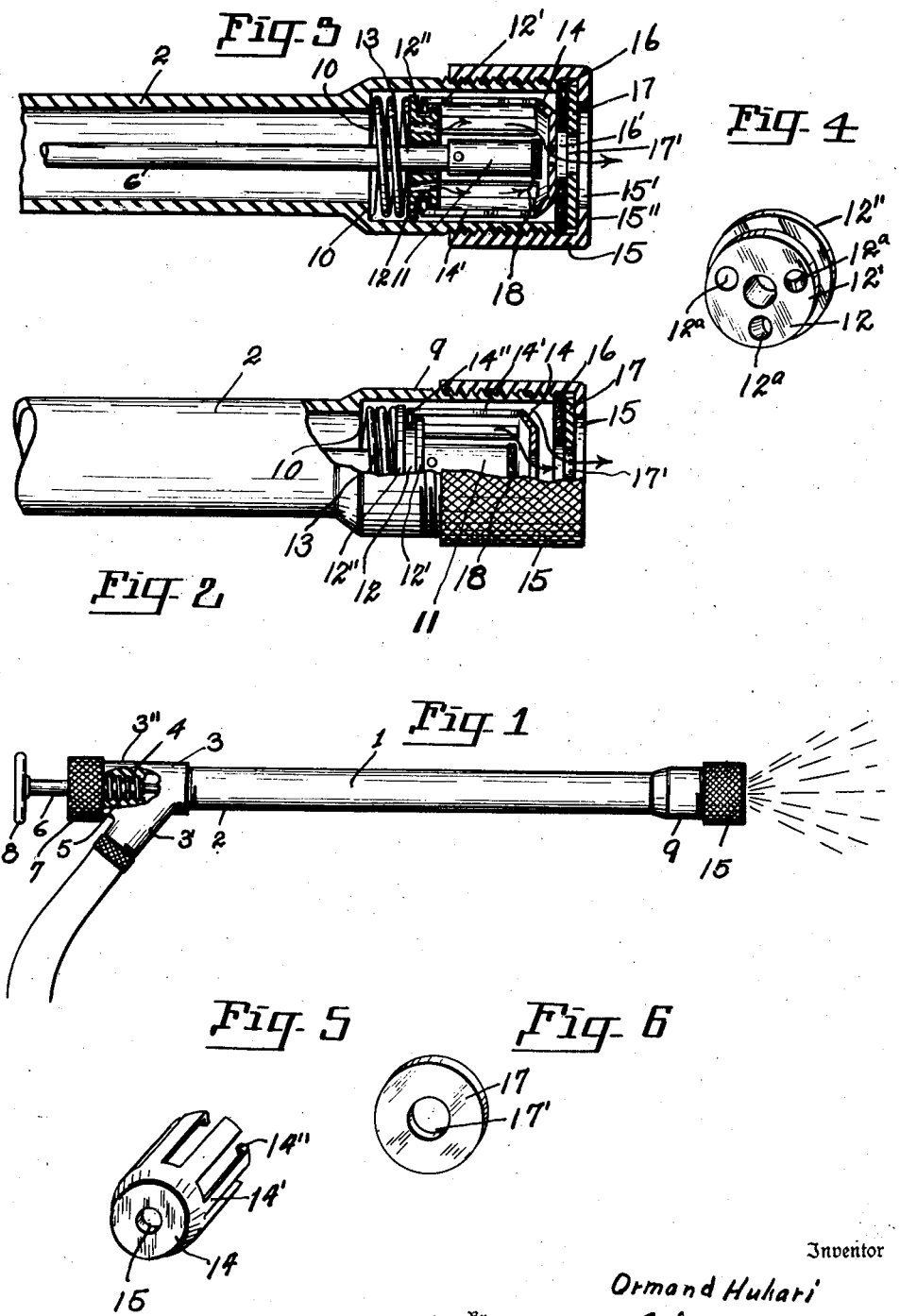
Inventor
Ormand Hukari
By
Cline Hartson
Attorney Patented Sept. 10, 1935

2,013,959

UNITED STATES PATENT OFFICE 2,013,959

SPRAY NOZZLE

Ormand Hukari, Hood River, Oreg.

Application September 24, 1934, Serial No. 745,307

7 Claims. (Cl. 299—116)

My invention relates to spray nozzles, and particularly relates to a control device and nozzle construction operating to control the diffusion of the spray. The primary object of the invention is to provide a nozzle which may be regulated to diffuse the spray either proximate the nozzle or at a distance therefrom, whereby the lower branches as well as the upper branches of trees may be sprayed with equal results.

Another object of my invention is to provide a nozzle having an improved valve structure which is operable to provide distant or proximate diffusion of spray, or is operable to entirely shut off or close the flow of spray fluid.

Another object of the invention is to provide improvements in spray nozzle heads and the apparatus contained therein operating to diffuse the spray fluids.

In the drawing—

Figure 1 is a side elevation, with partial section, of my invention.

Figure 2 is an enlarged fragmentary side elevation with parts in section, of the invention.

Figure 3 is an enlarged fragmentary side sectional elevation of the invention.

Figure 4 is a perspective of the valve sleeve which carries or supports a diffusing member.

Figure 5 is a perspective of the diffusing member employed in the present invention.

Figure 6 is a perspective of a nozzle disk.

In the drawing my invention is shown in its entirety and indicated by the Figure 1. It consists of an elongated barrel 2 provided with a three-way fitting 3 at the inlet end. Fitting 3 has a fluid inlet 3' and a control portion 3" the latter being in line with the axis of the barrel, while the former is diagonal thereto. The portion 3" is provided with female threads 4 into which are threaded the male threads 5 of the shaft or control rod 6, while a retaining cap 7 is secured to the end of the fitting. A handle 8 on the end of the rod exterior to the barrel provides a means for rotating rod 6. Rotation of the rod in one direction or the other will move it back or forth within the barrel. The fitting 3 is affixed to the rearward end of the barrel.

The forward end of the barrel has an enlargement or transversely enlarged portion 9 thus providing an internal ledge or seat 10 interiorly of the barrel. The rod 6 projects into the interior of the enlarged portion 9 where it terminates in a head 11. Mounted upon the rod 6 is a sleeve 12 provided with a forward flange 12' and a rearward flange 12" which are spaced somewhat from one another. Sleeve 12 is maintained upon rod 6 by the head 11. Between the sleeve 12 and the ledge or seat 10 is a spring 13 coiled about rod 6. This spring bears against the sleeve 12 urging the rod to the right or forwardly viewing Figures 2 and 3.

Connected to the sleeve 12 by means of the down-turned lugs 14" of its fingers 14' is a diffusing member 14. This member has a central aperture 15 in line with the axis of rod 6. The member 14 extends about the head 11, in outline being somewhat cylindrical in shape. Extending through the sleeve 12 are a number of passageways 12a. Fitted to the end of the enlarged portion 9, by suitable threads, is a retaining member 15 which is provided with a substantial aperture 15' in its end 15".

Between the end 15" and the end of the enlarged portion 9 of the barrel are placed two disks 16 and 17. The innermost disk is formed of somewhat yieldable material and serves as a gasket and a seat for the end of the member 14 when pressed against it, and is provided with a central aperture 16'. The outer disk 17 is a discharge disk and is provided with a discharge aperture 17'. By providing disks 17 having different size discharge openings the size of the discharge opening of the nozzle may be varied by changing the disks 17.

In operation, the member 3' is connected to a fluid supply, which may be a spray pump. The spray fluid passes into barrel 2 and toward the enlarged end thereof, passes through openings 12a, about the spring 13 and the member 14 to pass out the nozzle through openings 17'. This is the operation viewing Figure 2. The fluid so discharged does not immediately pass into spray form but travels some distance before doing so. When head 11 and member 14 are in the position shown in Figure 2 the nozzle may be used for spraying the top-most branches of a tree.

Figure 3 shows the nozzle arranged for spraying the lower branches of a tree. In this view the head 11 is moved forwardly by threading rod 6 in the threads in the member 3, this allows the member 14 to be moved to the position where it is pressed against 17 shutting out all flow of fluid except through the aperture 15. The member 14 is moved forwardly by the expansion of spring 13 which bears against and moves the sleeve 12, the sleeve carrying the member 14. In this position together with the smallness of aperture 15, the proximity of the head 11, and the fluid pressure, the fluid discharged from the apertures 15 and 17' forms a fine spray, this it does as it passes from the nozzle. In passing into the enlarged portion 9, the fluid passes through the apertures 12a or about the sleeve 12, and when the parts are in the position shown in Figure 2 the fluid passes from both sides of the member 14 as shown by the arrows. However, in Figure 3 the fluid discharged must pass through the aperture 15, and this aperture being comparatively small, together with the proximity of the head 11 causes the discharged fluid to change into a spray immediately.

The flow of fluid from the nozzle may be entirely shut off by moving the head forward to the member 16 until the member 18 engages it, thus covering the opening 15. The member 18 may be made of some compressible material for this purpose, such as rubber, likewise the member 16 may be of the same material. It is to be understood that the rod 6 and head 11 move somewhat independently of the sleeve 12. However when the head is moved backwardly a sufficient distance it engages the sleeve 12 and moves it also, together with the member 14 which travels with the sleeve.

While a specific form of the improvement has been described and illustrated herein, it is desired to be understood that the same may be varied, within the scope of the appended claims, without departing from the spirit of the invention.

Having described my invention, I claim—

1. A spray nozzle including a barrel having an enlarged discharge end providing an interior seat, a control rod movable back and forth therein terminating in a head, a sleeve on the rod rearwardly of the head, a spring seating between the sleeve and the seat and urging the sleeve forwardly, a diffusing member provided with a discharge opening carried by the sleeve, a disk provided with a discharge opening terminating the barrel, the rod when moved forwardly releasing and permitting the spring to cause the diffusing member to cover the disk whereby the relative size of its discharge opening produces a spray proximate the end of the nozzle, and when the rod is moved rearwardly compelling the diffusing member to uncover the disk whereby the relative larger size of the aperture in the disk causes the spray to form at a distance from the nozzle.

2. A spray nozzle including a barrel having a discharge end provided with an interior seat, a control rod movable back and forth therein terminating in a head, a sleeve on the rod rearwardly of the head, a member located between sleeve and seat and urging the sleeve forwardly, a diffusing member provided with a discharge opening carried by the sleeve, a disk provided with a discharge opening terminating the barrel, the rod when moved forwardly releasing and permitting the urging member to cause the diffusing member to cover the disk whereby the relative size of its discharge opening produces a spray proximate the end of the nozzle, and when the rod is moved rearwardly compelling the diffusing member to uncover the disk whereby the relative larger size of the aperture in the disk causes the spray to form at a distance from the nozzle.

3. The invention as claimed in claim 1 including construction for moving the head to a position to obstruct and stop the flow of fluid from the discharge opening of the nozzle.

4. A spray nozzle including a barrel having a discharge end provided with an interior seat, a control rod movable back and forth within the barrel and terminating in a head in the discharge end thereof, a sleeve on the rod rearwardly of the head, a spring seating between the sleeve and seat and urging the sleeve forwardly, a diffusing member provided with rearwardly directed arms attached to the sleeve and provided with a discharge opening in line with the axis of the head and rod, a disk provided with a discharge opening terminating the discharge end of the barrel, the rod when moved forwardly releasing and permitting the spring to cause the diffusing member to cover the disk whereby the relative size of its discharge opening produces a spray proximate the end of the nozzle, and when the rod is moved rearwardly compelling the diffusing member to uncover the disk whereby the relative larger size of the aperture in the disk permits the spray to form at a distance from the nozzle.

5. A spray nozzle including a barrel having a discharge end provided with a discharge aperture, a diffusing member provided with a discharge aperture relatively smaller than the discharge aperture of the barrel movable back and forth in the barrel, and a head located interiorly of the diffusing member and barrel and movable back and forth which when moved backwardly carries the diffusing member with it permitting fluid discharge from the nozzle to form a spray at a distance therefrom, and when moved forwardly releasing and permitting the spring to cause the diffusing member to cover the discharge opening of the nozzle whereby the fluid discharged forms a spray proximate the nozzle.

6. The invention as set forth in claim 5 wherein the head may be moved forwardly to cover the discharge opening in both the end of the nozzle and the diffusing member for the purpose of stopping the flow of fluid therefrom.

7. The invention as claimed in claim 5 wherein the head may be moved to a position to cover the discharge openings in the end of the nozzle and the diffusing member and is provided with a compressible member operating to prevent fluid leakage.

ORMAND HUKARI.